(12) United States Patent
Akahori (10) Patent No.: US 7,804,916 B2
(45) Date of Patent: Sep. 28, 2010

(54) DETECTOR FOR DETECTING A FREQUENCY-SHIFT KEYING SIGNAL BY DIGITAL PROCESSING

(75) Inventor: Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 944 days.

(21) Appl. No.: 11/645,566

(22) Filed: Dec. 27, 2006

(65) Prior Publication Data

US 2007/0160170 A1    Jul. 12, 2007

(30) Foreign Application Priority Data

Jan. 11, 2006    (JP)    ............................. 2006-003220

(51) Int. Cl.
*H03C 1/52*    (2006.01)
*H04L 27/00*    (2006.01)
*H04L 7/00*    (2006.01)
*H03K 9/00*    (2006.01)
*H04B 3/20*    (2006.01)

(52) U.S. Cl. ...................... 375/303; 375/295; 375/316; 375/354; 370/290

(58) Field of Classification Search ................. 375/295, 375/303, 316
See application file for complete search history.

(56) References Cited

U.S. PATENT DOCUMENTS

| | | | | |
|---|---|---|---|---|
| 4,291,275 A | * | 9/1981 | Nossen | 329/303 |
| 5,323,459 A | * | 6/1994 | Hirano | 379/391 |
| 6,240,073 B1 | * | 5/2001 | Reichman et al. | 370/319 |
| 6,240,282 B1 | * | 5/2001 | Kleider et al. | 455/226.1 |
| 6,263,014 B1 | * | 7/2001 | Chang et al. | 375/150 |
| 6,263,017 B1 | * | 7/2001 | Miller | 375/222 |
| 6,269,092 B1 | * | 7/2001 | Schilling | 370/342 |
| 6,891,905 B1 | * | 5/2005 | Malone et al. | 375/334 |
| 2001/0001617 A1 | * | 5/2001 | Koga et al. | 375/347 |
| 2001/0002202 A1 | * | 5/2001 | Feher | 375/130 |
| 2003/0004664 A1 | | 1/2003 | Ward et al. | |
| 2007/0032832 A1 | * | 2/2007 | Feher | 607/32 |
| 2008/0043868 A1 | * | 2/2008 | Feher | 375/260 |

FOREIGN PATENT DOCUMENTS

JP    9-023248    1/1997

* cited by examiner

*Primary Examiner*—Mohammad H Ghayour
*Assistant Examiner*—Sarah Hassan
(74) *Attorney, Agent, or Firm*—Studebaker & Brackett PC; Donald R. Studebaker (57) ABSTRACT

A frequency-shift keying (FSK) signal detector includes a binarizing circuit for receiving an FSK signal and expressing amplitude of the FSK signal in binary; a correlator for receiving the FSK signal expressed in binary and acquiring a correlation of the FSK signal; and an arithmetic unit for performing an arithmetic operation on the output of the correlator to detect and output the FSK signal. The correlator includes plural stages of shift register for sequentially shifting the FSK signal in response to a clock signal; a correlation filter for obtaining the correlation by a correlation signal sequence and a window function signal sequence which obtain a correlation value at one of two frequency components generated by frequency-shift keying; and another correlation filter for obtaining the correlation by a correlation signal sequence and a window function signal sequence which obtain a correlation value at the other of the two frequency components.

33 Claims, 9 Drawing Sheets

DETECTOR FOR DETECTING A FREQUENCY-SHIFT KEYING SIGNAL BY DIGITAL PROCESSING

BACKGROUND OF THE INVENTION

1. Field of the Invention

The present invention relates to a frequency-shift keying (FSK) signal detector for detecting an FSK signal, and more particularly to such a detector for detecting an FSK signal by digital processing.

2. Description of the Background Art

As a conventional FSK signal detector that detects an FSK signal by digital processing, for example, there is one which converts the output of an analog receiver to binary information, then detects frequency components by digital signal processing, and carries out demodulation. The conventional FSK frequency detector receives an input signal converted to an intermediate frequency (IF) and makes demodulation possible. In the case where the center frequency of the input IF signal to the FSK frequency detector preserves the following relationship, this conventional demodulation is possible.

Center frequency f0 of IF ≧ (Frequency fd equivalent to the modulating speed)×1.25 (for minimum shift keying)

$$fd=(f0-fs)\times 4=(fM-f0)\times 4.$$

In the case of minimum shift keying, two frequencies converted from a binary information signal are equal to two values shifted from the center frequency of an intermediate frequency (IF) by one-fourth of a frequency equivalent to the modulating speed, and the lower of the two frequencies has to be higher than the frequency equivalent to the modulating speed.

For instance, in the case of having correlation filters with correlation coefficient sequences C1 to C2n and D1 to D2n which have wavelengths of frequencies equivalent to a frequency fs lower than the center frequency of an intermediate frequency converted by modulation and to a frequency fM higher than the center frequency and which are the same in duration as the time length of one symbol, if the correlation coefficient sequences are longer, the bass band width of the correlation filters is narrower and therefore the property of removing noise is increased, but if they exceed the time length of one symbol, a modulated component of an adjacent symbol is added and therefore intersymbol interference takes place. For that reason, it is preferable that the correlation coefficient sequences be the same as the symbol time length. Therefore, demodulation is possible by the use of filters with correlation coefficient sequences which has the same length as the symbol time length and the same period as the frequency of fs or fM.

To simplify a circuit configuration that receives an FSK signal, Japanese Patent Laid-Open Publication No. 23248/1997 discloses a circuit configuration which converts the output of an analog receiver to binary information, then detects frequency components by digital signal processing, and performs demodulation. U.S. patent application Publication No. 2003/0004664 A1 to Ward et al., discloses a method of measuring jitter in serial data having periodic patterns.

However, if the frequency equivalent to the modulating speed always has the relationship of $$(f0-fs)\times 4=fd$$

$$f0=fs+(fd/4),$$

then the following expressions will be obtained:

$$f0<fd\times 1.25$$

$$fs+(fd/4)<fd\times 1.25$$

$$fs<fd.$$

Therefore, the wavelength of the frequency (fs) modulated to a lower frequency side than the center frequency is longer than the symbol time length. For that reason, in correlation filters, there is a problem that the wavelength of a modulated frequency cannot be arranged within the time length of one symbol. On the other hand, if the correlation coefficient sequences of correlation filters are made longer to obtain a correlation at a period of time longer than one symbol period, then the problem of the degradation of receiver characteristics will arise.

Thus, it is found that in the case of (center frequency of IF)<(frequency equivalent to the modulating speed)×1.25 (for minimum shift keying), the conventional method cannot be utilized.

SUMMARY OF THE INVENTION

It is a primary object of the present invention to provide an FSK signal detector that is capable of preventing the receiver characteristics from being degraded even when the wavelength of a frequency modulated to a lower frequency side than the center frequency, for example, of an FSK signal is longer than the time length of one symbol.

In accordance with the present invention, there is provided a frequency-shift keying (FSK) signal detector including a binarizing circuit for receiving an FSK signal and expressing amplitude of the FSK signal in binary; a correlator for receiving the FSK signal expressed in binary and acquiring a correlation of the FSK signal; and an arithmetic unit for performing an arithmetic operation on an output of the correlator to detect and output the FSK signal. The correlator comprises three major components: an m-stage shift register, where $\underline{m}$ is an integer of 2 or more, for sequentially shifting the FSK signal in response to a clock signal; a first correlation filter for obtaining the correlation by a correlation signal sequence and a window function signal sequence which obtain a correlation value at a first frequency of two frequency components generated by frequency-shift keying; and a second correlation filter for obtaining the correlation by a correlation signal sequence and a window function signal sequence which obtain a correlation value at a second frequency of the two frequency components.

The detector of the present invention may further include an amplitude controller provided before the binarizing circuit for suppressing an amplitude variation component of the FSK signal. In this case, the first and second correlation filters may include converting circuits for converting an output "0" of each stage of the shift register to a value of "−1" and an output "1" to a value of "+1" and for multiplying the converted values by the correlation signal sequence.

The m-stage shift register may be provided to correspond to a time length equivalent to a wavelength of the same frequency as a modulating speed. The arithmetic unit may generate demodulated data based on a width which varies in response to the clock signal supplied to the shift register. In this case, the arithmetic unit may comprise first and second subtracters for subtracting a predetermined value respectively from output values of the first and second correlation filters, first and second absolute value converters for respectively calculating absolute values of outputs of the first and second subtracters, first and second low-pass filters for respectively averaging outputs of the first and second absolute converters, and a first difference calculator for calculating a difference between outputs of the first and second low-pass filters.

The correlation signal sequences employed in the first and second correlation filters may respectively have the same cycles as wavelengths of respective frequencies of two frequency components generated by the frequency-shift keying based on a width which varies in response to the clock signal supplied to the shift register.

The aforementioned number $m$ may be an even number. The respective correlation signal sequences employed in the first and second correlation filters may be correlation signal sequences in which a signal which is supposed to be at a virtual intermediate position between a correlation signal corresponding to the (m/2)-th stage of the shift register and a correlation signal corresponding to the (m/2+1)-th stage of the shift register is in phase to, or inverted by 180 degrees from, corresponding one of two frequency components generated by frequency-shift keying based on a width which varies in response to the clock signal supplied to the shift register.

When the aforementioned number $m$ is an even number, the window function signal sequence employed in the first and second correlation filters may be a window function signal sequence in which window function signals, which correspond to a symbol time length fore and aft of a center of a time position between a window function signal corresponding to the (m/2)-th stage of the shift register and a window function signal corresponding to the (m/2 +1)-th stage of the shift register, have a higher gain and the remaining window signals have a lower gain.

The respective correlation signal sequences employed in the first and second correlation filters may be expressed in binary. The first and second correlation filters may carry out multiplication by shifting the window function signal sequence.

The correlator may further comprise a third correlation filter for obtaining the correlation by a correlation signal sequence and a window function signal sequence which obtain a correlation value at a first frequency of two frequency components generated by frequency-shift keying, and a fourth correlation filter for obtaining the correlation by a correlation signal sequence and a window function signal sequence which obtain a correlation value at a second frequency of the two frequency components. The arithmetic unit may further comprise third and fourth subtracters for subtracting a predetermined value respectively from output values of the third and fourth correlation filters, third and fourth absolute value converters for respectively calculating absolute values of outputs of the third and fourth subtracters, a first adder for adding up outputs of the first and third absolute value converters, a second adder for adding up outputs of the second and fourth absolute value converters, third and fourth low-pass filters for respectively averaging outputs of the first and second adders, and a second difference calculator for calculating a difference between outputs of the third and fourth low-pass filters.

When the aforementioned number $m$ is an even number, the correlation signal sequences employed in the first, second, third, and fourth correlation filters may have two correlation signal sequences which have the same cycles as wavelengths of respective frequencies of two frequency components generated by frequency-shift keying based on a width which varies in response to a clock signal supplied to the shift register, the two correlation signal sequences being shifted in phase by ¼ of the respective frequencies, with a virtual intermediate position between a correlation signal corresponding to the (m/2)-th stage of the shift register and a correlation signal corresponding to the (m/2+1)-th stage of the shift register being as reference.

When the aforementioned number $m$ may be an even number, the correlation signal sequences employed in the first, second, third, and fourth correlation filters may be correlation signal sequences in which, with respect to any of correlation signal sequences equivalent to two different frequency components generated by frequency-shift keying based on a width which varies in response to a clock signal supplied to the shift register, a signal which is supposed to be at a virtual intermediate position between a correlation signal corresponding to the (m/2)-th stage of the shift register and a correlation signal corresponding to the (m/2+1)-th stage of the shift register is in phase to, or inverted by 180 degrees from, corresponding one of two frequency components generated by frequency-shift keying based on a width which varies in response to the clock signal supplied to the shift register.

The respective correlation signal sequences employed in the first, second, third, and fourth correlation filters may be expressed in binary. The third and fourth correlation filters may carry out multiplication by shifting the window function signal sequence. The third and fourth correlation filters may include converting circuits for converting an output "0" of each stage of the shift register to a value of "−1" and an output "1" to a value of "+1" and for multiplying the converted values by the correlation signal sequence.

According to the present invention, even when the wavelength of a frequency modulated to a lower frequency side than the center frequency, for example, of an FSK signal is longer than the time length of one symbol, the degradation of receiver characteristics can be prevented. For example, even under the condition of (center frequency of IF)<(frequency equivalent to the modulating speed)×1.25 (for minimum-shift keying), FSK signals can be satisfactorily detected.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
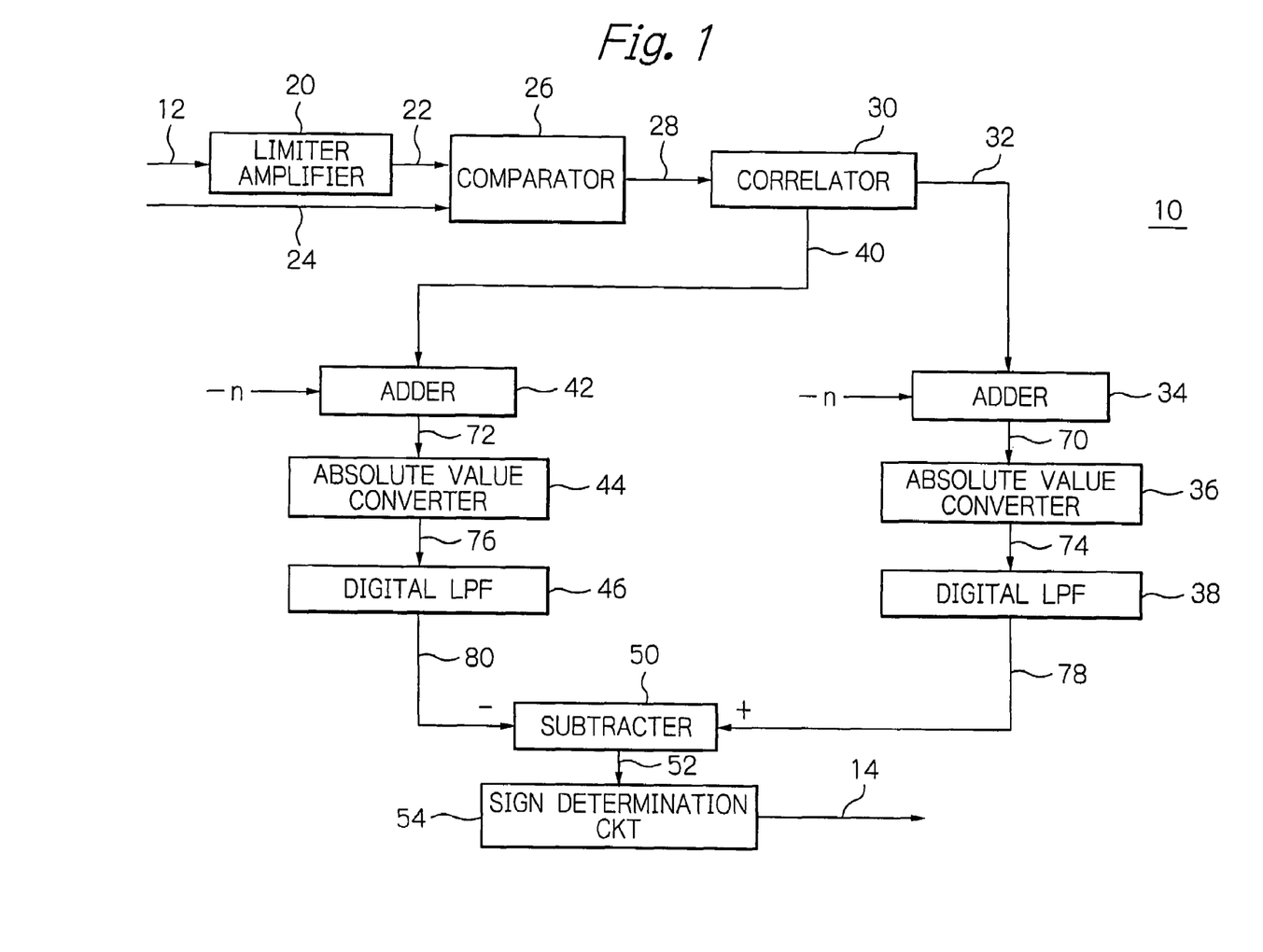
FIG. 1 is a schematic block diagram showing an embodiment of an FSK signal detector in accordance with the present invention.

An embodiment of a frequency-shift keying (FSK) signal detector according to the present invention will hereinafter be described in detail with reference to the accompanying drawings. Referring to FIG. 1, the FSK signal detector of this embodiment, generally designated with a reference numeral 10, is configured to frequency-detect an FSK signal 12 by digital processing and output demodulated data 14, and includes a limiter amplifier 20 to which the FSK signal 12 is input, and a comparator 26 to which the output 22 of the limiter amplifier 20 and an input 24 are connected.

The comparator 26 has its output 28 connected to a correlator 30. The correlator 30 has its one output 32 connected to a first adder 34 for subtracting a predetermined value. The adder 34 has its output 70 connected to a first absolute value converter 36, which has its output 74 connected to a first digital low-pass filter (LPF) 38. The first adder 34, first absolute value converter 36, and first digital low-pass filter 38 as a whole constitute a first processing circuit. The correlator 30 also has its other output 40 connected to a second adder 42 for subtracting a predetermined value. The second adder 42 has its output 72 connected to a second absolute value converter 44, which has its output 76 connected to a second digital low-pass filter 46. These devices likewise constitute a second processing circuit. The FSK signal detector 10 further includes a subtracter 50 to which the outputs 78 and 80 of the digital low-pass filters 38 and 46 are connected, and a sign determination circuit 54 to which the output 52 of the subtracter 50 is connected and from which demodulated data 14 is output.

The limiter amplifier 20 functions to receive the FSK signal 12 which is an intermediate frequency (IF) signal of a few MHz down-converted from a high frequency signal. The limiter amplifier 20 is an amplitude limiter used to prevent the amplitude of the FSK signal 12 from exceeding a specified level to suppress its amplitude variation components. Thus, the limiter amplifier 20 is capable of performing frequency detection without undergoing the influence of amplitude variation. The limiter amplifier 20 outputs as an FSK signal 22 a signal in which amplitude variation components have been suppressed. It is noted that reference numerals given to connections also represent signals appearing thereon.

The comparator 26 connected to the limiter amplifier 20 is a binarizing circuit for binarizing, or converting into a binary number, the amplitude of the FSK signal 22 output from the limiter amplifier 20 in binary (0 or 1). More specifically, the comparator 26 has its other input 24 supplied with a mid-point potential which is substantially equal to the mid-point level of the FSK signal 12, and compares the FSK signal 12 with the mid-point potential 24. When the amplitude of the FSK signal 12 is larger than the mid-point potential 24, the comparator 26 produces and outputs an FSK signal 28 which represents a binary value "1". When it is smaller, the comparator 26 produces and outputs an FSK signal 28 which represents a binary value "0". Thus, in the circuitry after the comparator 26, the FSK signal 28 can be handled as a binary signal representing the amplitude by a binary "1" or "0".

Figure 2:
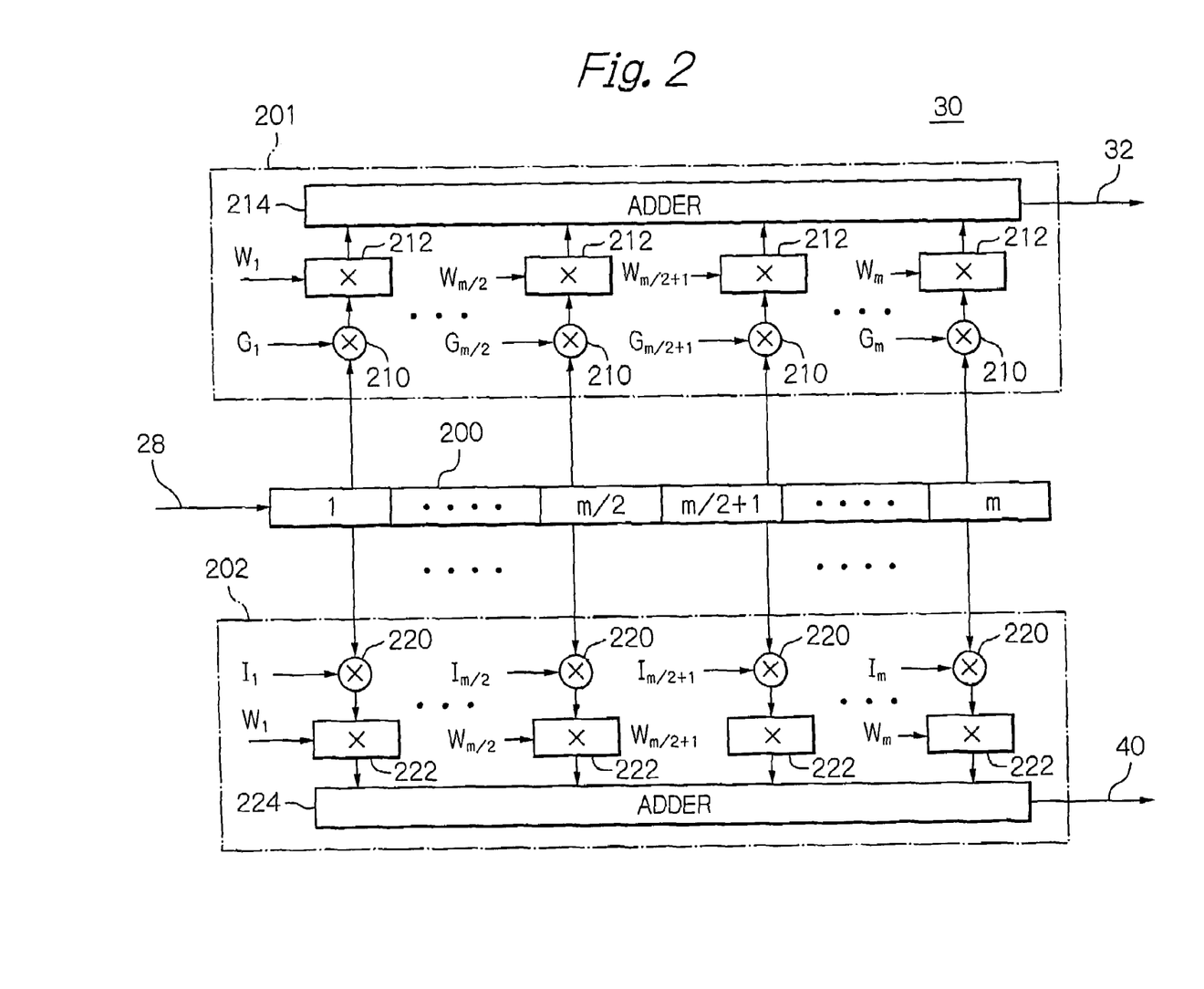
FIG. 2 is a schematic block diagram showing a configuration of the correlator shown in FIG. 1.

The correlator 30 connected to the output 28 of the comparator 26 is adapted to find a correlation with a correlation signal sequence having predetermined regularity. The internal configuration of the correlator 30 is shown in FIG. 2. As shown in the figure, the correlator 30 has plural (m) stages of shift register 200, where m is an integer of two or more, and two correlation filters 201 and 202 which receive values held in the stages of the shift register 200.

The first correlation filter 201 includes corresponding plural (m) arithmetic-logic units 210 that perform an arithmetic operation between the held values of the m stages of the shift register 200 and a correlation coefficient sequence ($G_1$, $G_{m/2}$, $G_{m/2+1}$, ..., $G_m$); corresponding plural (m) multipliers 212 that multiply the outputs of the arithmetic-logic units 210 by a window function signal sequence ($W_1$, $W_{m/2}$, $W_{m/2+1}$, ..., $W_m$); and an adder 214 that adds up the arithmetic results of the multipliers 212 and functions to form the output 32 of the adder 214. The arithmetic-logic unit 210 of the illustrative embodiment is constructed such that it converts the held value (0, 1) of each stage of the shift register 200 to a value (−1, 1) and then multiplies the converted value (−1.1) by the correlation coefficient sequence ($G_1$, $G_{m/2}$, $G_{m/2+1}$, ..., $G_m$).

The second correlation filter 202 includes corresponding plural (m) arithmetic-logic units 220 that perform an arithmetic operation between the held values of m stages of the shift register 200 and a correlation coefficient sequence ($I_1$, $I_{m/2}$, $I_{m/2+1}$, ..., $I_m$); corresponding plural (m) multipliers 222 that multiply the outputs of the arithmetic-logic units 220 by a window function signal sequence ($W_1$, $W_{m/2}$, $W_{m/2+1}$, ..., $W_m$); and an adder 224 that adds up the arithmetic results of the multipliers 222, and functions to form the output 42 of the adder 224. Each of the arithmetic-logic units 220, as with the arithmetic-logic units 210 described above, is constructed such that it converts the held value (0, 1) of corresponding one stage of the shift register 200 to a value (−1, 1) and then multiplies the converted value (−1, 1) by the correlation coefficient sequence ($I_1$, $I_{m/2}$, $I_{m/2+1}$, ..., $I_m$).

Figure 3:
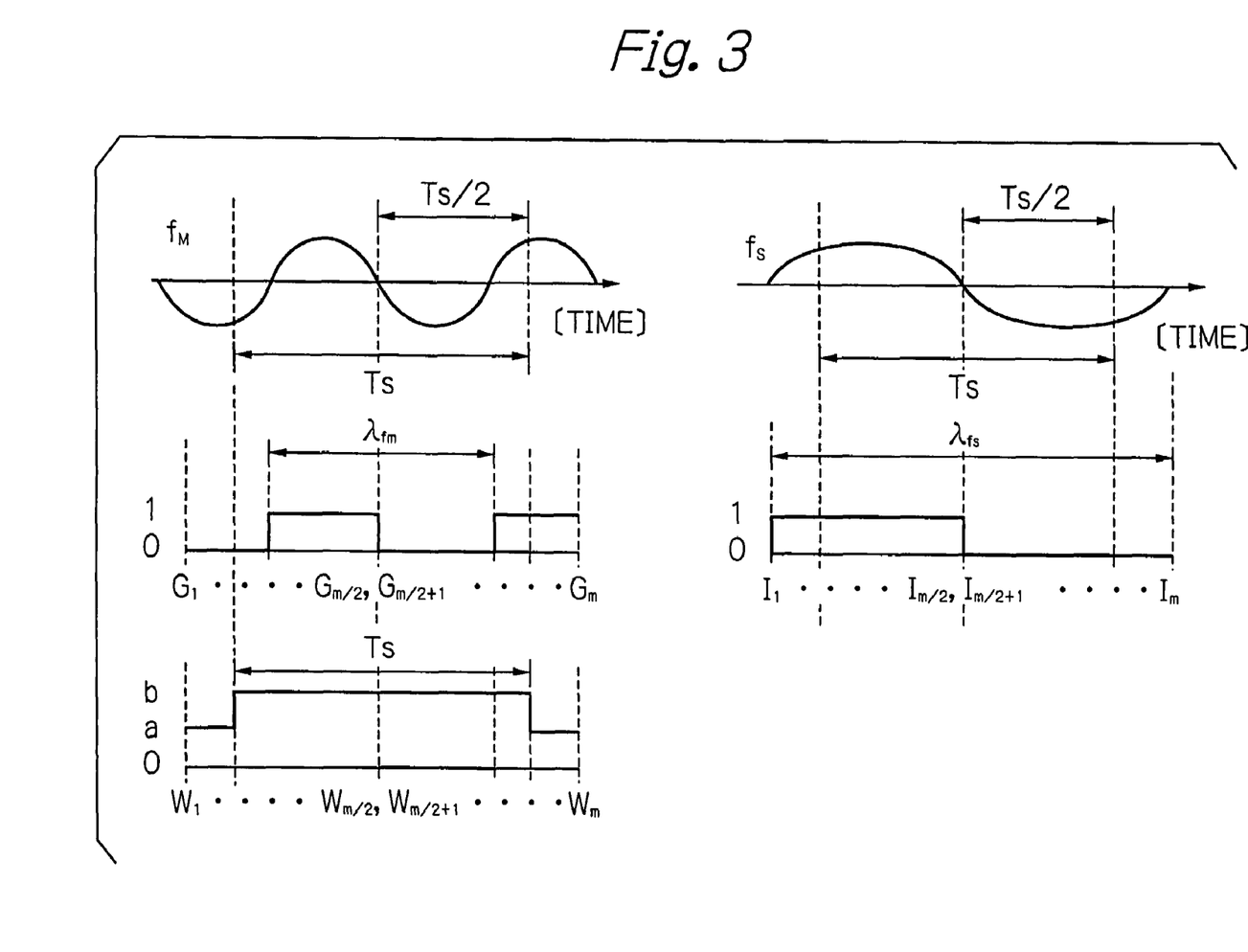
FIG. 3 shows a correlation coefficient sequence and a window function sequence employed in the correlator of FIG. 2.

The two correlation coefficient sequences ($G_1$ to $G_m$ and $I_1$ to $I_m$) in the correlator 30, as shown by the regularities of the correlation coefficient sequence and window function signal sequence in FIG. 3, are longer than one symbol time length $T_s$ and have the same cycles or periods as those of two desired frequencies $f_M$ and $f_s$. The two correlation coefficient sequences ($G_1$ to $G_m$ and $I_1$ to $I_m$) are provided one by one for two desired frequencies ($f_M$ and $f_s$).

Each of two correlation coefficient sequences ($G_1$ to $G_m$ and $I_1$ to $I_m$) is a sequence of corresponding plural (m) signals, and the time length of the m signals is equal to the wavelength of a frequency $f_s$ lower than the center frequency of an intermediate frequency (IF). In addition, each correlation coefficient sequence consists of zeros and ones.

The correlation coefficient sequence ($I_1$ to $I_m$) whose desired frequency is equal to the frequency $f_s$ lower than the center frequency is a sequence whose one cycle is equal to the time length of m signals. The correlation coefficient sequence ($G_1$ to $IG_m$) whose desired frequency is equal to the frequency $f_M$ higher than the center frequency is a sequence in which its one cycle is equal to the wavelength of a frequency equivalent to $f_M$, and which consists of (m/2) signals (0s and 1s) within the one cycle, that is, m signals (0s and 1s) within two cycles.

The correlation coefficient sequence ($G_1$ to $G_m$) has a phase relationship which varies from "0" to "1" or vice versa between $G_{m/2}$ and $G_{m/2+1}$. Similarly, the correlation coefficient sequence ($I_1$ to $I_m$) has a phase relationship which varies from "0" to "1" or vice versa between $I_{m/2}$ and $I_{m/2+1}$.

Next, the window function signal sequence will be described. Assuming that a length equivalent to the time length of one symbol is $T_s$, the window function signals corresponding to the length Ts fore and aft of the center position of the window function signal sequence have a value of b, while the remaining window function signals have a value of a. The values a and b are assumed to have a relationship of b>a. This makes it possible to suppress the influence of intersymbol interference by the window function signal sequence, while implementing the correlation filters 201 and 202 having a correlation coefficient sequence whose desired frequency is a frequency fs with a wavelength longer than $T_s$.

Returning again to FIG. 1, the output 32 of the correlator 30 is connected to the adders 34 and 42. Each of the adders 34 and 42 is used to add a value of −n to the output of the correlator 30. The outputs 70 and 72 of the adders 34 and 42 are connected to the absolute value converters 36 and 44. The outputs 74 and 76 of the absolute value converters 36 and 44 are connected to the digital low-pass filters 38 and 46, respectively. The outputs 78 and 80 of the digital low-pass filters 38 and 46 are connected to the subtracter 50.

The first adder 34 is used for adding a value of −n to the frequency detection output 32 of the correlator 30, and functions to subtract a value of n from the frequency detection output 32 and output the arithmetic result as its frequency detection output 70. This converts frequency detection output to a waveform having a width of change whose mid point is "0".

The first absolute value converter 36 connected to the output 70 of the first adder 34 functions to calculate the absolute value of the frequency detection output 70 of the first adder 34 and output the calculated absolute value as its frequency detection output 74.

The first digital low-pass filter 38 connected to the output 74 of the first absolute value converter 36 is used to calculate the moving average of the frequency detection output 74 of the first absolute value converter 36 over one symbol width of the FSK signal for one symbol period of time Ts. The first digital low-pass filter 38 functions to convert the frequency detection output 74 to a frequency detection signal whose amplitude varies in response to the frequency transition of the FSK signal and output the converted frequency detection signal on its output 78. The output 78 of the first digital low-pass filter 38 is connected to the plus (+) input of the subtracter 50.

The output 72 of the second adder 42 is likewise connected to the second absolute value converter 44. The second absolute value converter 44 functions to calculate the absolute value of the frequency detection output 72 and output the calculated absolute value on its frequency detection output 76. The output 76 of the second absolute value converter 44 is connected to the second digital low-pass filter 46. The second digital low-pass filter 46 functions to convert the frequency detection output 76 to a frequency detection signal whose amplitude varies in response to the frequency transition of the FSK signal and output the frequency detection signal on its output 80. The output 80 of the second digital low-pass filter 46 is connected to the minus (−) input of the subtracter 50.

The subtracter 50 is an arithmetic circuit that receives the frequency detection signal of the first digital low-pass filter 38 on its plus (+) input 78, receives the frequency detection signal of the second digital low-pass filter 46 on its minus (−) input 80, and calculates a difference between the two frequency detection signals 78 and 80. The subtracter 50 outputs the calculated value as its output 52.

The output 52 of the subtracter 50 is connected to the sign determination circuit 54, which functions to determine the sign (+ or −) of the output value of the subtracter 50 and generate demodulated data according to the determination. The sign determination circuit 54 outputs the demodulated data on its output 14. More specifically, even when the center frequency is less than the value equal to (frequency equivalent to the modulating speed)×1.25 (for minimum-shift keying), the use of the correlation filters 201 and 202 shown in FIG. 2 renders it possible to obtain the demodulated data 14 without substantially degrading the receiving characteristics.

Next, an alternative embodiment of the FSK signal detector will be described with reference to FIG. 4. As shown in the figure, the FSK signal detector of the alternative embodiment, generally designated by a reference numeral 400, includes a correlator 410 having four correlation filter systems, which will be described later. The correlator 410 has corresponding four output systems, of which two 420 and 422 are connected to adders 424 and 426, respectively. The adders 424 and 426 have respective outputs 440 and 442 connected to absolute value converters 428 and 430. Furthermore, the absolute value converters 36 and 428 have respective outputs 74 and 428 connected to an adder 432, while the absolute value converters 44 and 430 have respective outputs 76 and 446 connected to another adder 434. The adders 432 and 434 have respective outputs connected to digital low-pass filters 38 and 46, respectively. The remaining parts given the same reference numerals may be the same in structure and function as the parts shown in FIG. 1, so that a description of the same parts will not be repeated for avoiding redundancy.

Figure 5:
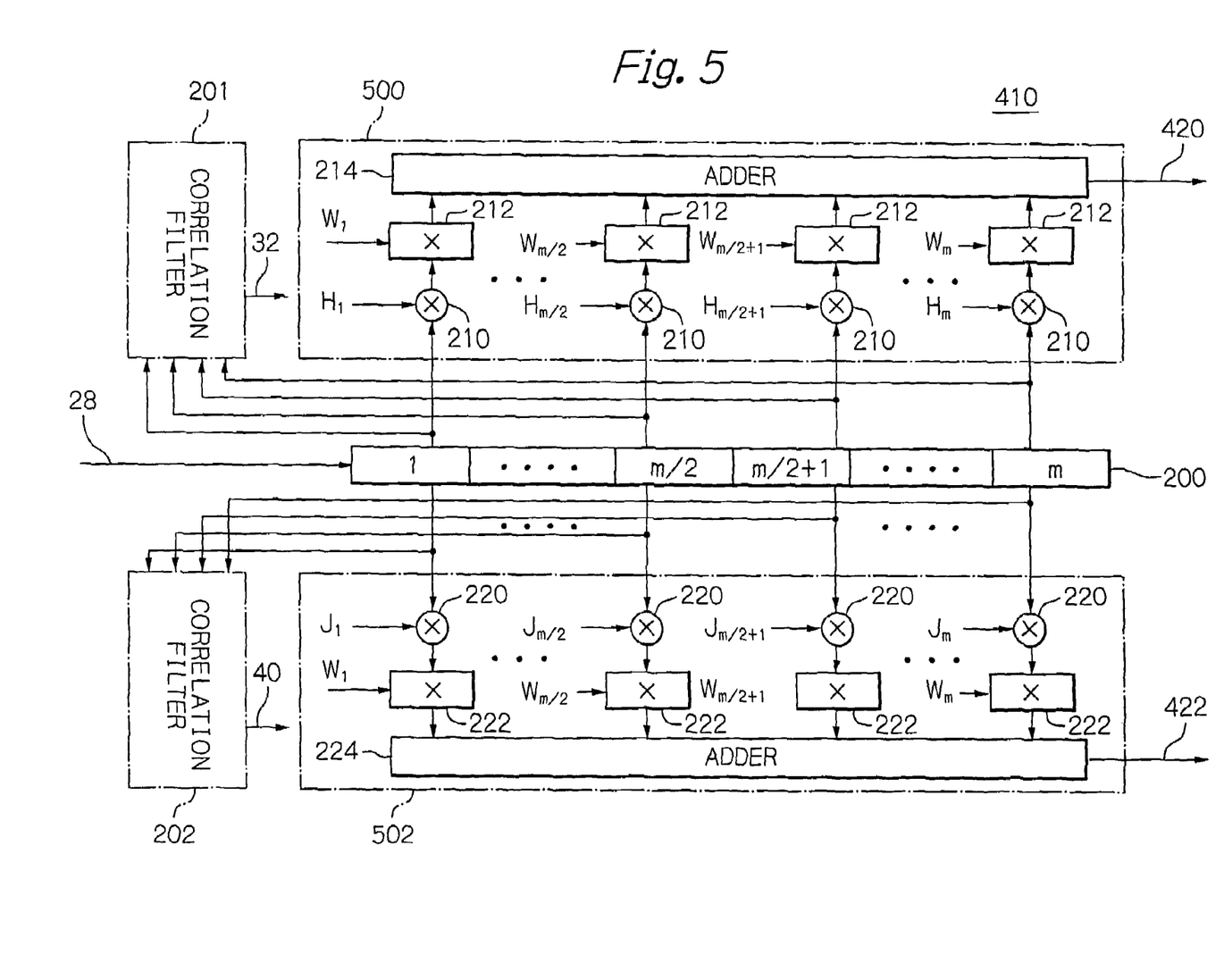
FIG. 5 is a schematic block diagram showing a configuration of the correlator shown in FIG. 4.

In the FSK signal detector 400 of the illustrative embodiment, the correlator 410 is configured to employ four correlation coefficient sequences. The internal configuration of the correlator 410 is shown in FIG. 5. As shown in the figure, in addition to the correlation filters 201 and 202 shown in FIG. 2, the correlator 410 is further equipped with correlation filters 500 and 502. The correlation filters 500 and 502 have the outputs thereof forming the outputs 420 and 422 of the correlator 410, respectively. It is noted in FIG. 5 that parts given the same reference numerals as those shown in FIG. 2 may be the same in structure and function as the parts shown in FIG. 1.

The one correlation filter 500 includes corresponding plural (m) arithmetic-logic units 210 that add a correlation coefficient sequence ($H_1$, $H_{m/2}$, $H_{m/2+1}$, ..., $H_m$) respectively to the held values of the m stages of shift register 200; the m multipliers 212 that multiply the outputs of the arithmetic-logic units 210 by a window function signal sequence ($W_1$, $W_{m/2}$, $W_{m/2+1}$, ..., $W_m$); and an adder 214 that adds up the arithmetic results of the multipliers 212.

The other correlation filter 502 includes the corresponding plural (m) arithmetic-logic units 220 that add a correlation coefficient sequence ($J_1$, $J_{m/2}$, $J_{m/2+1}$, ..., $J_m$) respectively to the held values of the m stages of shift register 200; the m multipliers 222 that multiply the outputs of the arithmetic-logic units 220 by a window function signal sequence ($W_1$, $W_{m/2}$, $W_{m/2+1}$, ..., $W_m$); and an adder 224 that adds up the arithmetic results of the multipliers 222.

Each of the four correlation coefficient sequences ($G_1$ to $G_m$, $H_1$ to $H_m$, $I_1$ to $I_m$, and $J_1$ to $J_m$) is loner than one symbol time length $T_s$. Two correlation coefficient sequences ($G_1$ to $G_m$ and $H_1$ to $H_m$) with the same cycle as a desired frequency (fM) are provided for the desired frequency (fM) and are shifted in phase by 90 degrees with the center of the sequence as reference. The remaining two correlation coefficient sequences ($I_1$ to $I_m$ and $J_1$ to $J_m$) with the same cycle as another desired frequency (fs) are provided for the desired frequency (fs) and are shifted in phase by 90 degrees with the center of the sequence as reference.

Returning back to FIG. 4, the outputs 420 and 422 of the correlator 410 are connected to the adders 424 and 426, respectively. Each of the adders 34, 424, 42 and 426 is used to add a value of −U to the corresponding output of the correlator 410. The outputs 70, 440, 72 and 442 of the adders 34, 424, 42 and 426 are connected to absolute value converters 36, 428, 44 and 430, respectively. The outputs 74 and 44 of the absolute value converters 36 and 428 are connected to the one adder 432, and the outputs 76 and 446 of the absolute value converters 44 and 430 are connected to the other adder 434, respectively. The outputs 450 and 452 of these adders 432 and 434 are connected to digital low-pass filters 38 and 46, respectively.

Figure 6:
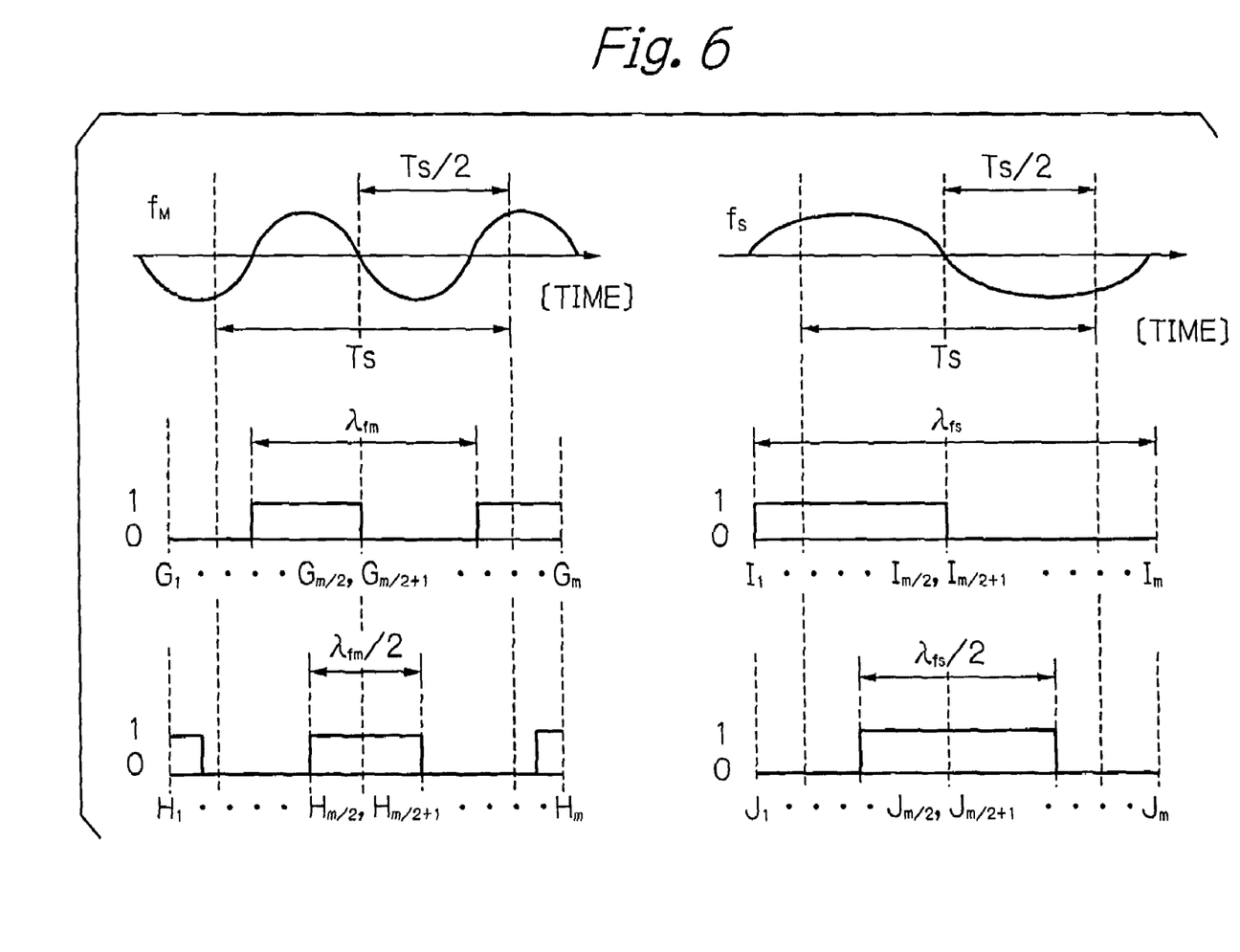
FIG. 6 shows four correlation coefficient sequences employed in the correlator shown in FIG. 5.

Well, examples of the four correlation coefficient sequences are shown in FIG. 6. In the alternative embodiment, as with the illustrative embodiment shown in and described with reference to FIG. 1, the four correlation coefficient sequences each consist of a corresponding plurality (m) of correlation signals (0s and 1s). These correlation coefficient sequences include two correlation coefficient sequences ($I_1$ to $I_m$, and $J_1$ to $J_m$) in which $f_s$ is a desired frequency. In the two correlation coefficient sequences ($I_1$ to $I_m$, and $J_1$ to $J_m$), the plural (m) correlation signals are disposed with in one cycle. The correlation signals are disposed with a shift in phase equivalent to a value of m/4 so that the two correlation coefficient sequences ($I_1$ to $I_m$ and $J_1$ to $J_m$) are shifted from each other by 90 degrees.

Each of the correlation coefficient sequences ($G_1$ to $G_m$ and $H_1$ to $H_m$) in which $f_M$ is a desired frequency is a sequence in which its one cycle is substantially equal to the wavelength of a frequency equivalent to $f_M$, and which consists of half (m/2) of the plurality of correlation signals (0s and 1s) within the one cycle, that is, the plurality (m) of correlation signals (0s and 1s) within two cycles. The correlation signals are disposed with a shift in phase substantially equivalent to a value of λfM/4 so that the two correlation coefficient sequences ($G_1$ to $G_m$ and $H_1$ to $H_m$) are shifted from each other by 90 degrees. Moreover, the correlation coefficient sequence ($G_1$ to $G_m$) has a phase relationship which varies from "0" to "1" or vice versa between $G_{m/2}$ and $G_{m/2+1}$. Similarly, the correlation coefficient sequence ($I_1$ to $I_m$) has a phase relationship which varies from "0" to "1" or vice versa between $I_{m/2}$ and $I_{m/2+1}$. Note that when these correlation coefficient sequences are divided by 2, the plurality m be an even number.

Figure 7:
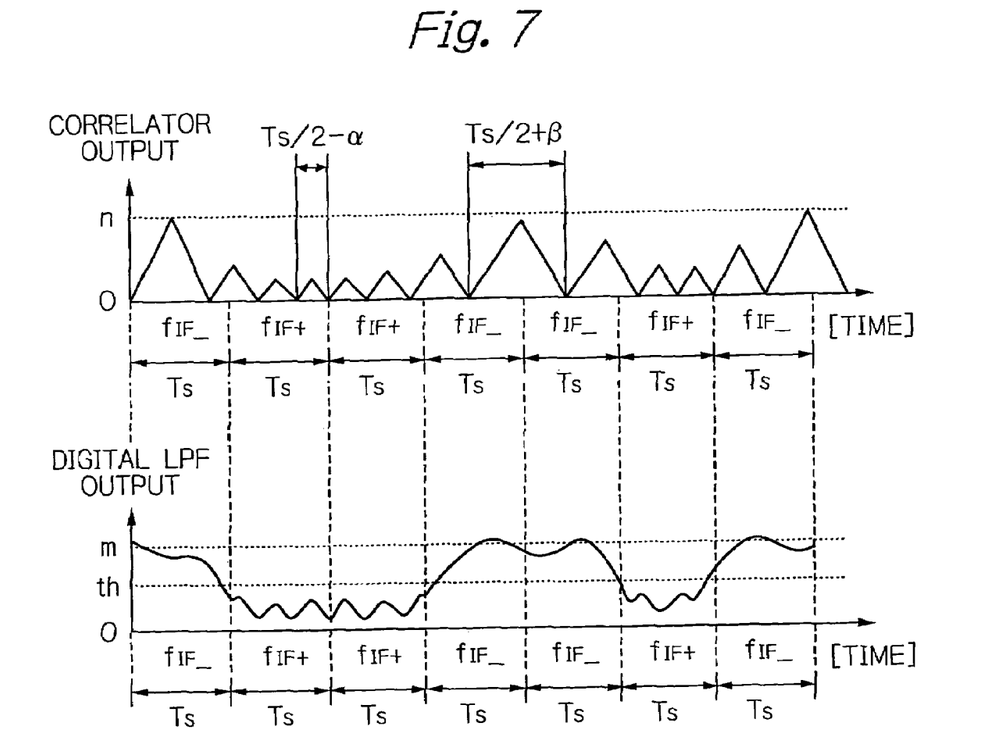
FIG. 7 shows correlator output and digital low-pass filter (LPF) output in the case where correlation coefficient sequences are prepared one by one for each desired frequency.

If correlation coefficient sequences were prepared one by one for each desired frequency, as shown in FIG. 7, unwanted or undesirable frequency components would appear in the output waveform of the digital low-pass filter. This is because frequency components in the output waveform of the absolute value converter which is input of the digital low-pass filter would have influence on the output signal of the digital low-pass filter. If the characteristics of the digital low-pass filter were changed to remove unwanted frequency components, modulated components themselves would also be removed. If unwanted frequency components appear in the output waveform of the digital low-pass filter, there would be cases where, depending upon a determination time position in determining modulated information by that waveform, determination is performed at a position near the intermediate position (which is a threshold value th of the digital LPF output waveform in FIG. 7) of a binary modulated signal, and consequently, demodulation errors due to noise could be liable to occur. For that reason, unwanted frequency components could cause the degradation of receiving characteristics.

Figure 8:
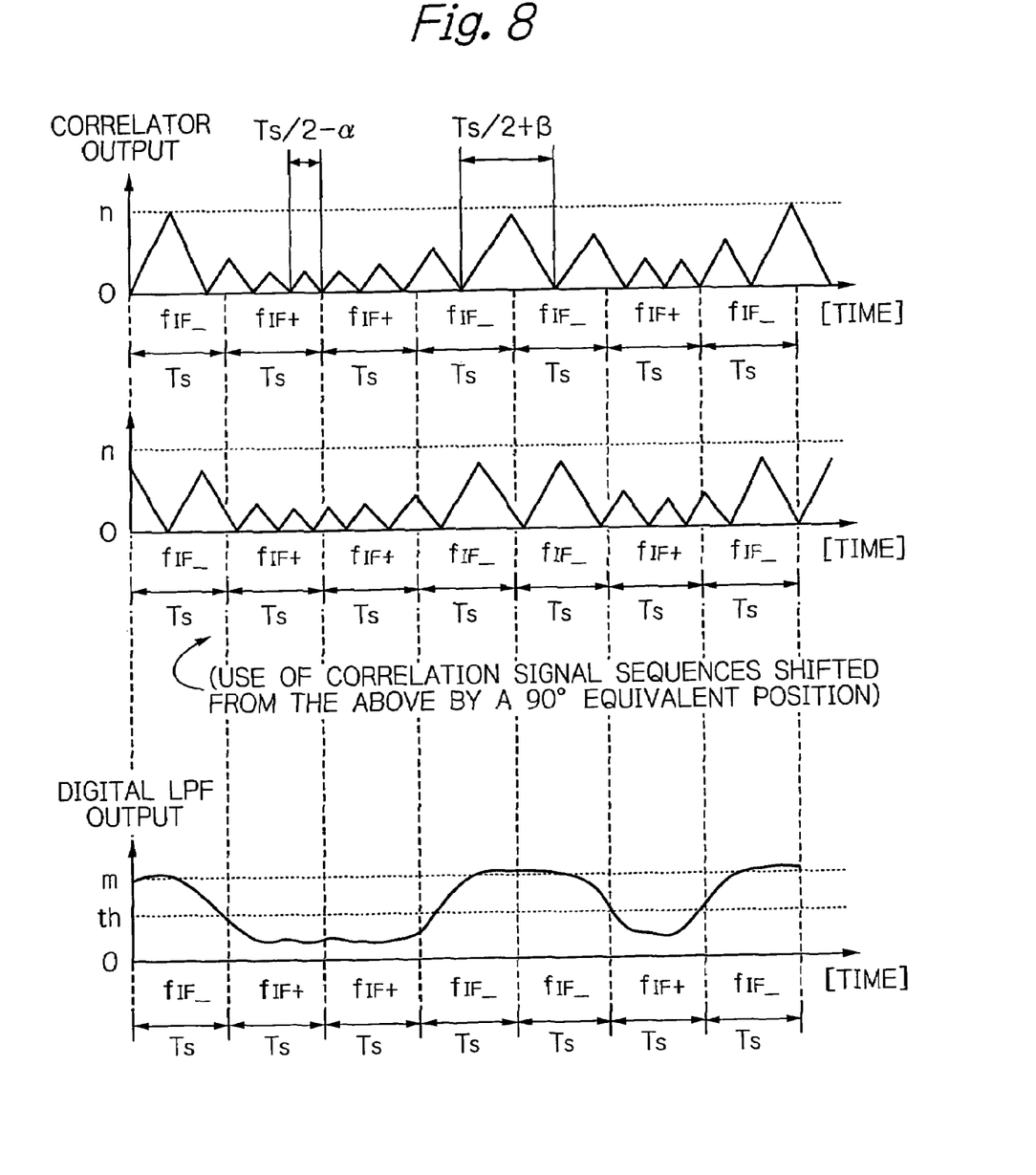
FIG. 8 shows correlator output and digital LPF output in the case where correlation coefficient sequences are prepared two by two for each desired frequency in accordance with the alternative embodiment.

In contrast, in the alternative embodiment, as shown in FIG. 8, correlation coefficient sequences are provided two by two for each desired frequency. The respective two correlation coefficient sequences are arranged so that a difference in phase therebetween has a time difference equivalent to 90 degrees. The output signals of the absolute value converters 36 and 428, obtained by the use of these correlation coefficient sequences, are added in the adder 423. Similarly, the output signals of the absolute value converters 44 and 430 are added in the adder 434. In this manner, unwanted frequency components in input signals of the digital low-pass filters 38 and 46 can be removed. This can prevent the receiver characteristics from being degraded.

Figure 4:
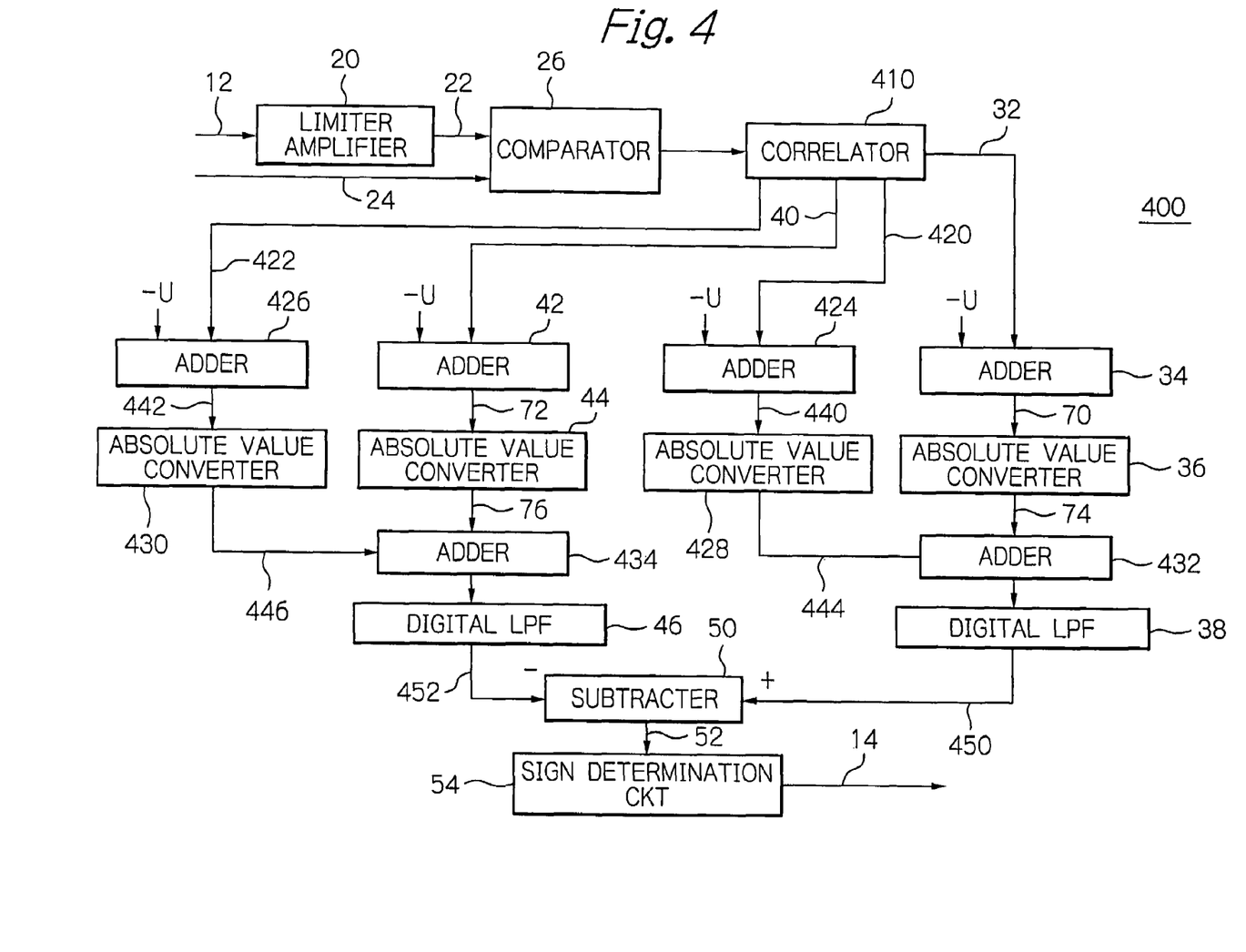
FIG. 4 is a schematic block diagram showing an alternative embodiment of the FSK signal detector of the present invention.
Figure 9:
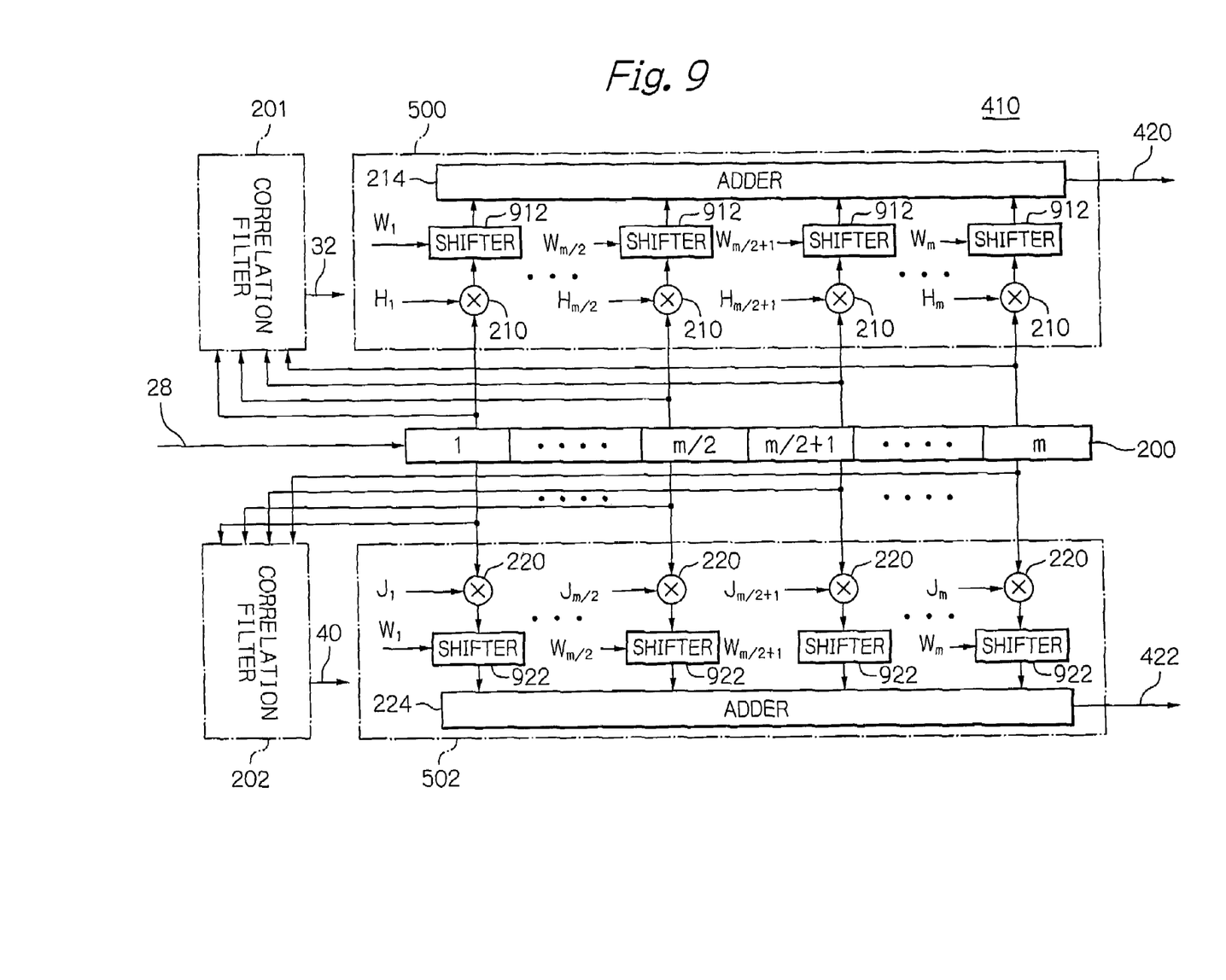
FIG. 9 is a schematic block diagram showing a configuration of a correlator employed in another alternative embodiment of the FSK signal detector of the present invention.

While the correlation filters 500 and 502, FIG. 5, in the correlator 410 of the alternative embodiment shown in FIG. 4 are configured to include multipliers, the present invention is not limited to this specific configuration. For example, as shown in FIG. 9, the multipliers 212 and 222 may be replaced respectively with shifters 912 and 922 that shift the output of each multiplier.

The entire disclosure of Japanese patent application No. 2006-3220 filed on Jan. 11, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A frequency-shift keying (FSK) signal detector comprising:
   a binarizing circuit for receiving an FSK signal and expressing amplitude of the FSK signal in binary;
   a correlator for receiving the FSK signal expressed in binary and acquiring a correlation of the FSK signal; and
   an arithmetic unit for performing an arithmetic operation on an output of said correlator to detect and output the FSK signal;
   said correlator comprises:
   a plurality of stages of shift register for sequentially shifting the FSK signal in response to a clock signal;
   a first correlation filter for obtaining the correlation by a correlation signal sequence and a window function signal sequence which obtain a correlation value at a first frequency of two frequency components generated by frequency-shift keying; and
   a second correlation filter for obtaining the correlation by a correlation signal sequence and a window function signal sequence which obtain a correlation value at a second frequency of the two frequency components;
   a third correlation filter for obtaining the correlation by a correlation signal sequence and a window function signal sequence which obtain a correlation value at the first frequency of two frequency components generated by frequency-shift keying; and
   a fourth correlation filter for obtaining the correlation by a correlation signal sequence and a window function signal sequence which obtain a correlation value at the second frequency of the two frequency components;
   wherein said plurality of stages of shift register are provided to correspond to a time length associated with a wavelength of a frequency corresponding to a modulating speed; and
   said arithmetic unit generates demodulated data based on a width which varies in response to the clock signal supplied to said shift register; and
   wherein said arithmetic unit comprises:
   first and second subtracters for subtracting a predetermined value respectively from output values of said first and second correlation filters;
   first and second absolute value converters for respectively calculating absolute values of outputs of said first and second subtracters;
   first and second low-pass filters for respectively averaging outputs of said first and second absolute converters; and a first difference calculator for calculating a difference between outputs of said first and second low-pass filters;

third and fourth subtracters for subtracting a predetermined value respectively from output values of said third and fourth correlation filters;

third and fourth absolute value converters for respectively calculating absolute values of outputs of said third and fourth subtracters;

a first adder for adding up outputs of said first and third absolute value converters;

a second adder for adding up outputs of said second and fourth absolute value converters;

third and fourth low-pass filters for respectively averaging outputs of said first and second adders; and a second difference calculator for calculating a difference between outputs of said third and fourth low-pass filters.

2. The detector in accordance with claim 1, wherein each of said first and second correlation filters includes converting circuits each for converting an output "0" of corresponding one of said stages of shift register to a value of "−1" and an output "1" to a value of "+1" and for multiplying a resultant value by the correlation signal sequence.

3. The detector in accordance with claim 1, wherein the correlation signal sequences employed in said first and second correlation filters respectively have cycles corresponding to wavelengths of respective frequencies of two frequency components generated by the frequency-shift keying based on a width which varies in response to the clock signal supplied to said shift register.

4. The detector in accordance with claim 1, wherein the plurality is an even natural number represented by m, and each of the correlation signal sequences employed in said first and second correlation filters is a correlation signal sequence in which a signal which is supposed to be at a virtual intermediate position between a correlation signal corresponding to the (m/2)-th stage of shift register and a correlation signal corresponding to the (m/2 +1)-th stage of shift register is in phase to, or inverted by 180 degrees from, corresponding one of two frequency components generated by frequency-shift keying based on a width which varies in response to the clock signal supplied to said shift register.

5. The detector in accordance with claim 1, wherein the plurality is an even natural number represented by m, and the window function signal sequence employed in said first and second correlation filters is a window function signal sequence in which window function signals, which correspond to a symbol time length fore and aft of a center of a time position between a window function signal corresponding to the (m/2)-th stage of shift register and a window function signal corresponding to the (m/2+1)-th stage of shift register, have a higher gain and the remaining window signals have a lower gain.

6. The detector in accordance with claim 1, wherein the correlation signal sequences employed in said first and second correlation filters are expressed in binary.

7. The detector in accordance with claim 1, wherein said first and second correlation filters carry out multiplication by shifting the window function signal sequence.

8. The detector in accordance with claim 1, further comprising an amplitude controller provided before said binarizing circuit for suppressing an amplitude variation component of the FSK signal.

9. A frequency-shift keying (FSK) signal detector comprising:

a binarizing circuit for receiving an FSK signal and expressing amplitude of the FSK signal in binary;

a correlator for receiving the FSK signal expressed in binary and acquiring a correlation of the FSK signal; and an arithmetic unit for performing an arithmetic operation on an output of said correlator to detect and output the FSK signal;

said correlator comprises:

a plurality of stages of shift register for sequentially shifting the FSK signal in response to a clock signal;

a first correlation filter for obtaining the correlation by a correlation signal sequence and a window function signal sequence which obtain a correlation value at a first frequency of two frequency components generated by frequency-shift keying; and a second correlation filter for obtaining the correlation by a correlation signal sequence and a window function signal sequence which obtain a correlation value at a second frequency of the two frequency components;

a third correlation filter for obtaining the correlation by a correlation signal sequence and a window function signal sequence which obtain a correlation value at the first frequency of two frequency components generated by frequency-shift keying; and a fourth correlation filter for obtaining the correlation by a correlation signal sequence and a window function signal sequence which obtain a correlation value at the second frequency of the two frequency components;

wherein said plurality of stages of shift register are provided to correspond to a time length associated with a wavelength of a frequency corresponding to a modulating speed; and said arithmetic unit generates demodulated data based on a width which varies in response to the clock signal supplied to said shift register; and wherein said arithmetic unit comprises:

first and second subtracters for subtracting a predetermined value respectively from output values of said first and second correlation filters;

first and second absolute value converters for respectively calculating absolute values of outputs of said first and second subtracters;

first and second low-pass filters for respectively averaging outputs of said first and second absolute converters; and a first difference calculator for calculating a difference between outputs of said first and second low-pass filters; and wherein the plurality is an even natural number represented by m, and the correlation signal sequences employed in said first, second, third, and fourth correlation filters have two correlation signal sequences which have cycles corresponding to wavelengths of respective frequencies of two frequency components generated by frequency-shift keying based on a width which varies in response to the clock signal supplied to said shift register, the two correlation signal sequences being shifted in phase by ¼ of the respective frequencies, with a virtual intermediate position between a correlation signal corresponding to the (m/2)-th stage of shift register and a correlation signal corresponding to the (m/2+1)-th stage of said shift register being as reference.

10. A frequency-shift keying (FSK) signal detector comprising:

a binarizing circuit for receiving an FSK signal and expressing amplitude of the FSK signal in binary;

a correlator for receiving the FSK signal expressed in binary and acquiring a correlation of the FSK signal; and an arithmetic unit for performing an arithmetic operation on an output of said correlator to detect and output the FSK signal;

said correlator comprises:

a plurality of stages of shift register for sequentially shifting the FSK signal in response to a clock signal;

a first correlation filter for obtaining the correlation by a correlation signal sequence and a window function signal sequence which obtain a correlation value at a first frequency of two frequency components generated by frequency-shift keying; and a second correlation filter for obtaining the correlation by a correlation signal sequence and a window function signal sequence which obtain a correlation value at a second frequency of the two frequency components;

a third correlation filter for obtaining the correlation by a correlation signal sequence and a window function signal sequence which obtain a correlation value at the first frequency of two frequency components generated by frequency-shift keying; and a fourth correlation filter for obtaining the correlation by a correlation signal sequence and a window function signal sequence which obtain a correlation value at the second frequency of the two frequency components;

wherein said plurality of stages of shift register are provided to correspond to a time length associated with a wavelength of a frequency corresponding to a modulating speed; and said arithmetic unit generates demodulated data based on a width which varies in response to the clock signal supplied to said shift register; and wherein said arithmetic unit comprises:

first and second subtracters for subtracting a predetermined value respectively from output values of said first and second correlation filters;

first and second absolute value converters for respectively calculating absolute values of outputs of said first and second subtracters;

first and second low-pass filters for respectively averaging outputs of said first and second absolute converters; and a first difference calculator for calculating a difference between outputs of said first and second low-pass filters; and wherein the plurality is an even natural number represented by $\underline{m}$, and the correlation signal sequences employed in said first, second, third, and fourth correlation filters are correlation signal sequences in which, with respect to any of correlation signal sequences equivalent to two different frequency components generated by frequency-shift keying based on a width which varies in response to the clock signal supplied to said shift register, a signal which is supposed to be at a virtual intermediate position between a correlation signal corresponding to the (m/2)-th stage of shift register and a correlation signal corresponding to the (m/2+1)-th stage of shift register is in phase to, or inverted by 180 degrees from, corresponding one of two frequency components generated by frequency-shift keying based on a width which varies in response to the clock signal supplied to said shift register.

11. The detector in accordance with claim 1, wherein the correlation signal sequences employed in said first, second, third, and fourth correlation filters are expressed in binary.

12. The detector in accordance with claim 1, wherein said third and fourth correlation filters carry out multiplication by shifting the window function signal sequence.

13. The detector in accordance with claim 1, wherein each of said third and fourth correlation filters includes converting circuits each for converting an output "0" of corresponding one of said stages of shift register to a value of "−1" and an output "1" to a value of "+1" and for multiplying a resultant value by the correlation signal sequence.

14. The detector in accordance with claim 9, further comprising an amplitude controller provided before said binarizing circuit for suppressing an amplitude variation component of the FSK signal.

15. The detector in accordance with claim 9, wherein each of said first and second correlation filters includes converting circuits each for converting an output "0" of corresponding one of said stages of shift register to a value of "−1" and an output "1" to a value of "+1" and for multiplying a resultant value by the correlation signal sequence.

16. The detector in accordance with claim 9, wherein the correlation signal sequences employed in said first and second correlation filters respectively have cycles corresponding to wavelengths of respective frequencies of two frequency components generated by the frequency-shift keying based on a width which varies in response to the clock signal supplied to said shift register.

17. The detector in accordance with claim 9, wherein the plurality is an even natural number represented by $\underline{m}$, and each of the correlation signal sequences employed in said first and second correlation filters is a correlation signal sequence in which a signal which is supposed to be at a virtual intermediate position between a correlation signal corresponding to the (m/2)-th stage of shift register and a correlation signal corresponding to the (m/2+1)-th stage of shift register is in phase to, or inverted by 180 degrees from, corresponding one of two frequency components generated by frequency-shift keying based on a width which varies in response to the clock signal supplied to said shift register.

18. The detector in accordance with claim 9, wherein the plurality is an even natural number represented by $\underline{m}$, and the window function signal sequence employed in said first and second correlation filters is a window function signal sequence in which window function signals, which correspond to a symbol time length fore and aft of a center of a time position between a window function signal corresponding to the (m/2)-th stage of shift register and a window function signal corresponding to the (m/2+1)-th stage of shift register, have a higher gain and the remaining window signals have a lower gain.

19. The detector in accordance with claim 9, wherein the correlation signal sequences employed in said first and second correlation filters are expressed in binary.

20. The detector in accordance with claim 9, wherein said first and second correlation filters carry out multiplication by shifting the window function signal sequence.

21. The detector in accordance with claim 9, wherein the correlation signal sequences employed in said first, second, third, and fourth correlation filters are expressed in binary.

22. The detector in accordance with claim 9, wherein said third and fourth correlation filters carry out multiplication by shifting the window function signal sequence.

23. The detector in accordance with claim 9, wherein each of said third and fourth correlation filters includes converting circuits each for converting an output "0" of corresponding one of said stages of shift register to a value of "−1" and an output "1" to a value of "+1" and for multiplying a resultant value by the correlation signal sequence.

24. The detector in accordance with claim 10, further comprising an amplitude controller provided before said binarizing circuit for suppressing an amplitude variation component of the FSK signal.

25. The detector in accordance with claim 10, wherein each of said first and second correlation filters includes converting circuits each for converting an output "0" of corresponding one of said stages of shift register to a value of "−1" and an output "1" to a value of "+1" and for multiplying a resultant value by the correlation signal sequence.

26. The detector in accordance with claim 10, wherein the correlation signal sequences employed in said first and second correlation filters respectively have cycles corresponding to wavelengths of respective frequencies of two frequency components generated by the frequency-shift keying based on a width which varies in response to the clock signal supplied to said shift register.

27. The detector in accordance with claim 10, wherein the plurality is an even natural number represented by $\underline{m}$, and each of the correlation signal sequences employed in said first and second correlation filters is a correlation signal sequence in which a signal which is supposed to be at a virtual intermediate position between a correlation signal corresponding to the (m/2)-th stage of shift register and a correlation signal corresponding to the (m/2+1)-th stage of shift register is in phase to, or inverted by 180 degrees from, corresponding one of two frequency components generated by frequency-shift keying based on a width which varies in response to the clock signal supplied to said shift register.

28. The detector in accordance with claim 10, wherein the plurality is an even natural number represented by $\underline{m}$, and the window function signal sequence employed in said first and second correlation filters is a window function signal sequence in which window function signals, which correspond to a symbol time length fore and aft of a center of a time position between a window function signal corresponding to the (m/2)-th stage of shift register and a window function signal corresponding to the (m/2+1)-th stage of shift register, have a higher gain and the remaining window signals have a lower gain.

29. The detector in accordance with claim 10, wherein the correlation signal sequences employed in said first and second correlation filters are expressed in binary.

30. The detector in accordance with claim 10, wherein said first and second correlation filters carry out multiplication by shifting the window function signal sequence.

31. The detector in accordance with claim 10, wherein the correlation signal sequences employed in said first, second, third, and fourth correlation filters are expressed in binary.

32. The detector in accordance with claim 10, wherein said third and fourth correlation filters carry out multiplication by shifting the window function signal sequence.

33. The detector in accordance with claim 10, wherein each of said third and fourth correlation filters includes converting circuits each for converting an output "0" of corresponding one of said stages of shift register to a value of "−1" and an output "1" to a value of "+1" and for multiplying a resultant value by the correlation signal sequence.

* * * * *